UNITED STATES PATENT OFFICE.

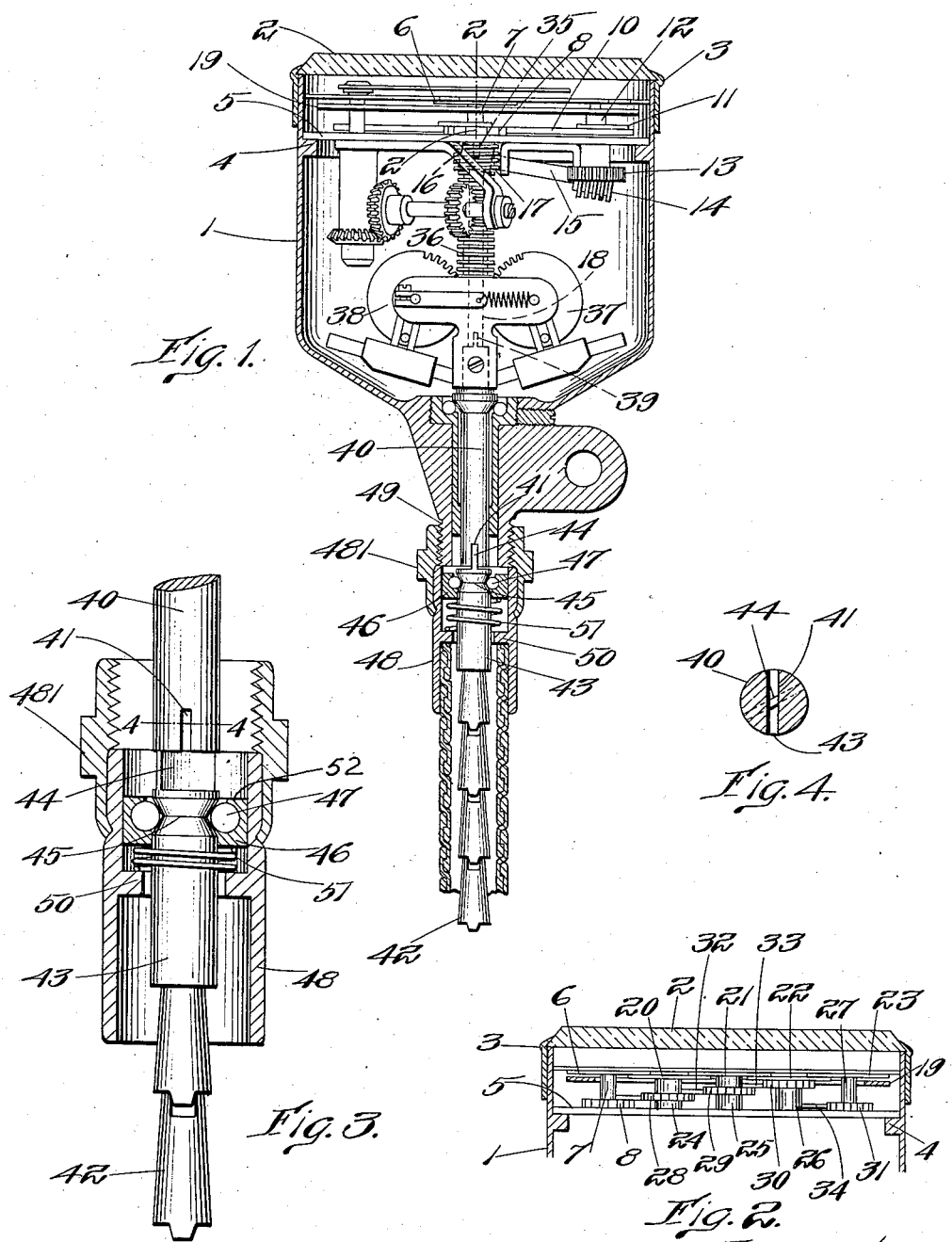

GEORGE D. PEEBLES, OF MEDFORD, MASSACHUSETTS, ASSIGNOR TO STANDARD THERMOMETER COMPANY, OF BOSTON, MASSACHUSETTS, A CORPORATION OF MAINE.

SHAFT-COUPLING FOR SPEEDOMETERS.

1,111,670.     Specification of Letters Patent.     Patented Sept. 22, 1914.

Application filed October 22, 1913. Serial No. 796,717.

*To all whom it may concern:*

Be it known that I, GEORGE D. PEEBLES, citizen of the United States, residing at Medford, county of Middlesex, State of Massachusetts, have invented a certain new and useful Improvement in Shaft-Couplings for Speedometers, of which the following is a specification, reference being had therein to the accompanying drawings.

Speedometers are usually connected by a coupling with a flexible shaft which in turn is connected with the driving mechanism of the vehicle. The driving connection between the flexible shaft and the speedometer sometimes employed is to provide the end of the flexible coupling with a tongue and to provide the end of the main spindle or shaft of the speedometer with a slot with which the said tongue on the driving shaft should engage when the two members are coupled together, so that the driving shaft may rotate the speedometer main spindle, the coupling end of the flexible shaft being connected with a tubular coupling having a union formed with an internal thread which screws onto an externally threaded hollow stem at the base of the speedometer case within which is contained the speedometer shaft or main spindle. When the coupling is screwed up onto the stem of the speedometer case it should bring the tongue of the flexible shaft into engagement with the slot in the speedometer main spindle. It frequently happens that when the coupling has been screwed up far enough to bring the said tongue against the end of the speedometer main spindle the tongue will strike crosswise of the slot instead of in alinement with the slot, producing what is termed cross coupling. When this occurs if the coupling is still farther screwed up, either the flexible shaft or the speedometer main spindle must yield longitudinally or something must give way, because the screwing up of the coupling causes the end of the tongue on the flexible shaft to press harder and harder upon the end of the speedometer main spindle. In the ordinary construction the flexible driving shaft is nonslidable backward on account of the manner in which it is seated in the coupling, and the speedometer main spindle has its other end connected with the rack spindle which engages the odometer plate. The result is that the odometer plate usually bends or buckles under the strong pressure occasioned by screwing up the coupling sleeve. As the odometer plate serves as the bed on which are mounted the various mechanisms of the speedometer, if the odometer plate is bent or buckled that will disarrange the delicate parts of the speedometer, especially the various gears and dogs by which the recording number wheels are actuated. Now after the coupling has thus been screwed up far enough so that it bends the odometer plate in the manner described, if the driving mechanism is started in motion, as soon as the flexible shaft has rotated far enough to turn the tongue through a sufficient portion of a rotation to bring it into alinement with the slot in the speedometer main spindle the pressure may then be sufficient to cause the tongue to engage with the slot and rotate the speedometer main and rack spindles. If so, it will move or attempt to move the various rotary parts of the speedometer and on acount of their disarranged position it results in great damage to the mechanism.

The object of the present invention is to provide in the coupling a yielding seat for the flexible driving shaft so that in the event of the cross coupling as above described the continued rotation of the coupling will cause the flexible driving shaft to yield longitudinally, thereby relieving the pressure on the speedometer spindle and preventing the bending or buckling of the odometer plate. Then after the driving mechanism is started and the flexible shaft is rotated a sufficient portion of a rotation to bring the tongue into alinement with the groove in the end of the speedometer main spindle the tension of the yielding seat of the flexible shaft will cause the tongue to snap into engagement with the slot so that the speedometer will operate in the usual and proper manner.

The invention will be fully understood from the following description taken in connection with the accompanying drawings, and the novel features thereof will be pointed out and clearly defined in the claims at the close of the specification.

In the drawings,—Figure 1 is a longitudinal section of a speedometer, a portion of the flexible shaft and a coupling embodying the invention, showing the parts in the position where the tongue is properly engaged in the slot and properly coupled. Fig. 2 is a longitudinal section on line 2—2 of Fig. 1. Fig.

3 is an enlarged longitudinal section showing the parts in cross coupled position. Fig. 4 is a cross sectional view on line 4—4 of Fig. 3.

Referring now to the drawings,—1 represents the speedometer case having a bevel glass cover 2 on its outer end held in place by the spun bezel 3. It is formed with an interior annular shoulder 4 on which is seated the odometer plate 5 which serves as a mount for the various shafts and bearings for most of the mechanism of the speedometer. It is deemed unnecessary to describe this mechanism in detail, but briefly some of the parts are as follows: 6 is the tenths wheel carried by the shaft 7 on which is mounted a ratchet wheel 8 which is engaged by the pawl 10, said pawl 10 being actuated by an eccentric 11 mounted on a shaft 12 which carries a pinion 13, said pinion 13 engaging with a worm 14 on a shaft 15. Said shaft 15 carries a pinion 16 which engages with a worm 17 mounted on the speedometer rack spindle 18. 19 represents the annular internal gear trip ring. The number wheels 20, 21, 22, 23 respectively are mounted on the shafts or studs 24, 25, 26, 27 and are formed with hubs carrying thereon respectively the star wheels 28, 29, 30 and 31 respectively. The hubs of the number wheels 20, 21, 22 are provided respectively with driving dogs 32, 33, 34 which respectively are adapted to engage with the star wheel on the hub of the next higher number wheel in the usual manner.

Projecting down from the under side of the odometer plate centrally therewith is a pin 35 which serves as a centering pin for the apertured upper end of the speedometer rack spindle 18 which bears against the under side of the odometer plate. The worm 17 already referred to is mounted fast upon the upper portion of the rack spindle 18. The rack spindle as shown passes through the cylindrical rack 36 which is engaged by the segment gears 37, 38 which form a part of the governor but which form no part of the present invention. The lower end of the rack spindle 18 is slotted and engages a pin 39 on the upper end of the shaft 40 whose lower end is forked or formed with a slot 41. The flexible shaft 42 terminates in a link 43 having a tongue 44 on its end which for convenience is hereinafter referred to as the coupling end of the driving shaft and which is adapted to engage with the slot 41 in the speedometer main spindle when the tongue and slot are brought into alinement with each other so that when the shaft 42 is rotated it will rotate the main spindle 40 and thereby also rotate the rack spindle 18 connected therewith. The link 43 is formed with an annular groove 45, surrounding which is a collar 46 which is held in engagement with the said link by the ball bearings 47 which are seated partly in the groove 45 of the link 43 and partly in the annular internal groove in the collar 46 so that the flexible shaft can freely turn within said collar. Said collar 46 will be referred to hereinafter as the head of the flexible shaft. The collar 46 is first formed with the sides extending up without any inturned flange at the top. It is assembled with the flexible shaft 43 in that form, and the balls 47 can be easily inserted into the cup formed by the collar and the annular groove 45 of the shaft. After the parts are then assembled, the top of the collar is spun or pressed in, forming the inturned upper flange 52 as shown in Figs. 1 and 3, which securely retains the balls in position. A sleeve 48 is provided into which the flexible shaft extends, and a coupling nut or union 481 has a swivel connection with said sleeve 48 so that the union 481 can rotate without rotating the sleeve 48. The upper end of said union or nut 481 is internally screw threaded so that it may be screwed onto the externally threaded stem 49 of the speedometer case 1 through which the speedometer main spindle 40 extends. The said sleeve 48 is formed with an annular internal shoulder 50 on which is seated a coil spring 51. The lower end of the collar 46 is seated upon said spring 51 which thereby forms a yielding seat and which yields under pressure allowing the flexible shaft to be pushed backward, compressing the spring, and when the backward pressure is relaxed the said spring will tend to resume its normal form and carry forward the head or coupling end of the flexible shaft again.

Now in the operation of the device, when the flexible shaft is to be coupled up with the speedometer, the union 481 will be screwed onto the threaded stem 49 of the speedometer case and if after being set part way up the tongue 44 strikes crosswise of the slot 41, so that the tongue cannot enter the slot, the continued screwing up of the union while the ends of the two shafts are in contact with each other will cause a back pressure of the collar 46 on the spring seat 51, compressing the spring 51 more and more as the coupling is set up so that the driving or flexible shaft 42 will yield backward as fast as the coupling is set up, and thereby take up the pressure in a large degree so that the main spindle 40 and rack spindle 18 will not have to yield and there will be no buckling or bending of the odometer plate 5. Now when the driving mechanism with which the flexible shaft is connected at the other end is started up so that the shaft 42 rotates, as soon as it is rotated sufficiently for the tongue 44 to come into alinement with the slot 41, which in no event would be more than one-half rotation, the expansion of the spring 51 will cause the tongue 44 to snap into the slot 41 and make the driving connection so that then the speedometer main spindle and rack spindle will begin to rotate with the shaft 42 and actuate the recording or indicating mechanism.

It is obvious that the form of the coupling and union shown may be employed in combination with any two shafts having a tongue and slot connection such as that shown in connection with shafts 40 and 43, one of the shafts being formed with a head 46. In other words the form of shaft and coupling described is not necessarily limited to use with a speedometer. The shaft 40 might be connected with other mechanism, there being a proper case around the shaft 40 with which the union 481 may be connected.

What I claim is:

1. A speedometer driving shaft having a head, in combination with a coupling consisting of a sleeve having a shoulder on the inner periphery intermediate the ends, a union connected with said sleeve having an internally screw threaded portion between the said shoulder and one end for connection with the speedometer case, and a coil spring seated on said shoulder on the side toward the said threaded portion of the union to form a seat for the said head of the driving shaft while the said shaft extends back through the opposite end of said coupling.

2. A speedometer driving shaft having a head, in combination with a coupling consisting of a sleeve having an annular shoulder on the inner periphery intermediate the ends, a union connected with said sleeve and having an internally screw threaded portion between the said shoulder and one end for connection with a speedometer case, and a coil spring seated on said shoulder on the side toward the said threaded portion of the union to form a seat for the said head of the driving shaft, the said annular shoulder forming a restricted aperture for passage of said driving shaft, the interior diameter of said sleeve at the union end being sufficient to receive the head of the shaft.

3. A speedometer having a shaft or spindle connected with the actuating mechanism of the speedometer and having a case with a threaded tubular stem surrounding the said shaft or spindle, a detachable driving shaft, one of said two shafts being constructed with a tongue on one end and the adjacent end of the other of said shafts being formed with a slot whereby said tongue and slot are adapted to engage with each other, said driving shaft being formed with a collar rotatable thereon slightly back of the coupling end of the said shaft, in combination with a coupling sleeve having a shoulder on the inner periphery thereof intermediate the ends, a union connected with said sleeve and having an internally screw threaded portion for connection with the screw threaded stem of the speedometer case, and a coil spring seated on said shoulder on the side toward the said threaded portion of the union to form a seat for the said collar of the driving shaft, said driving shaft extending back through the rear end of said sleeve.

4. A speedometer having an actuating shaft or spindle, a driving shaft, one of said two shafts being formed with a tongue on the end thereof and the other of said two shafts being formed with a slot whereby said two shafts are adapted to engage with each other, in combination with a screw threaded union a coupling comprising a sleeve having at one end a swivel connection with said screw threaded union, a speedometer case having an apertured portion surrounding the speedometer shaft and threaded to receive the threaded end of said union, said driving shaft passing through said sleeve and being provided with a collar adjacent the portion which engages the speedometer shaft, and a spring seat within said coupling sleeve on which the said collar is seated whereby the said driving shaft is permitted to yield backward under longitudinal pressure.

5. A speedometer having a shaft or spindle connected with the driving mechanism of the speedometer and a case having a threaded tubular stem surrounding the said shaft, a driving shaft connected with the driving mechanism of the vehicle or machine with which the speedometer is to be connected, one of said two shafts having at one end thereof a slot and the adjacent end of the other of said shafts having a tongue which is adapted to engage with said slot whereby the rotation of the driving shaft will rotate the speedometer shaft, a coupling sleeve having at one end a tapped out union adapted to engage with the threaded stem of the speedometer case, said sleeve also being formed with a spring seat and said driving shaft being formed with a shoulder which is adapted to be seated on said spring while the end of the shaft is inclosed within said sleeve, said spring seat yielding to the pressure of the tongue on the end of one shaft against the end of the other shaft if the said tongue is crosswise of the slot when the coupling is screwed up.

6. A speedometer having a shaft or spindle connected with the actuating mechanism of the speedometer, a driving shaft, one of said two shafts being formed with a tongue at one end and the other of said two shafts being formed with a slot at one end whereby the two shafts may be engaged together so that the rotation of the driving shaft will rotate the speedometer shaft, a casing for the speedometer, a coupling sleeve which surrounds the connecting end of said driving shaft and having a spring seat on which is seated a flanged projection on the driving shaft, said coupling being formed with a screw threaded union portion and said casing being formed with a threaded portion with which said union end of the sleeve is adapted to be engaged to draw the adjacent ends of the two shafts together.

7. In combination with a speedometer, a speedometer shaft, a speedometer case formed with an apertured portion surrounding the speedometer shaft, a screw threaded union which engages with said apertured portion of the speedometer case, a driving shaft having a head, and a coupling connected with said union and having a spring seat for the head of the driving shaft which yields in a backward direction to pressure on the end of the shaft.

8. In combination with a speedometer, a speedometer shaft, a case formed with an aperture through which the speedometer shaft passes, a driving shaft having a laterally extending swivel head thereon, a tubular coupling through the rear end of which said driving shaft passes, said coupling being provided with a yielding seat for the head of said driving shaft, and a tubular union, one end of which is connected with said coupling and the other end of which is secured to said casing at the said apertured portion thereof.

9. In combination with a speedometer, a speedometer shaft, a case formed with an aperture through which the speedometer shaft passes, a coupling, a tubular union for connecting said coupling with the said apertured portion of the speedometer case, a driving shaft which passes through the rear end of said coupling and has a flanged head, and an apertured spring seat within said coupling, the rear face of said flanged head of said driving shaft being seated upon said spring seat.

10. In combination, two shafts one of said two shafts being formed with a tongue at one end and the other of said two shafts being formed with a slot at one end, whereby the two shafts may be engaged together so that the rotation of one of said shafts will rotate the other, a coupling sleeve which surrounds the connecting end of said first shaft, said first shaft being formed with a head, a spring seat in said coupling on which said head is seated, a screw threaded tubular union, a casing for said second shaft having an aperture through which said second shaft passes, and a tubular screw threaded union which engages with the apertured portion of a casing for the second shaft and is connected with the said coupling.

11. In combination, two shafts, a casing for one of said shafts formed with an aperture through which the said first shaft passes, a screw threaded union which engages with said apertured portion of said case, said second shaft having a head, a coupling connected with said union and having a spring seat for the head of said second shaft which yields in a backward direction to pressure on the end of said shaft.

12. In combination with a speedometer, a speedometer shaft, a case formed with an apertured portion through which the speedometer shaft passes, a driving shaft, one of said two shafts being formed with a slot and the other of said two shafts being formed with a tongue adapted to engage with the slot of the other shaft, said driving shaft being formed with a flange head, a tubular coupling surrounding said head, said driving shaft passing out through the rear end of said coupling, a spring seat within said coupling for the head of said driving shaft which yields in a backward direction to pressure on the end of the shaft, and a tubular union, one end of which engages with said coupling and the other end of which engages with the apertured portion of said case.

In testimony whereof I affix my signature, in presence of two witnesses.

GEORGE D. PEEBLES.

Witnesses:
WILLIAM A. COPELAND,
ALICE H. MORRISON.